United States Patent [19]

Suetaka et al.

[11] Patent Number: 5,032,930
[45] Date of Patent: Jul. 16, 1991

[54] ELECTRONIC STILL CAMERA

[75] Inventors: Hiroyuki Suetaka; Shigeki Kurahashi, both of Tokyo, Japan

[73] Assignee: Casio Computer Co., Ltd., Tokyo, Japan

[21] Appl. No.: 559,504

[22] Filed: Jul. 20, 1990

Related U.S. Application Data

[62] Division of Ser. No. 412,924, Sep. 26, 1988, abandoned, which is a division of Ser. No. 131,662, Dec. 11, 1987, abandoned.

[30] Foreign Application Priority Data

Dec. 18, 1986 [JP] Japan ................. 61-193677
Dec. 18, 1986 [JP] Japan ................. 61-299976

[51] Int. Cl.$^5$ ............................. H04N 5/781
[52] U.S. Cl. ....................... 358/342; 358/906
[58] Field of Search ........... 358/335, 342, 906, 909; 360/33.1, 35.1, 60

[56] References Cited

U.S. PATENT DOCUMENTS

| | | |
|---|---|---|
| 3,649,752 | 3/1972 | Kinjo . |
| 4,057,830 | 11/1977 | Adcock . |
| 4,163,256 | 7/1979 | Adcock . |
| 4,262,301 | 4/1981 | Erlichman . |
| 4,366,501 | 12/1982 | Tsunekawa . |
| 4,450,487 | 5/1984 | Koide . |
| 4,531,164 | 7/1985 | Maeda et al. ............ 358/906 |
| 4,532,558 | 7/1985 | Oota . |
| 4,544,959 | 10/1985 | Kozuki et al. . |
| 4,567,535 | 1/1986 | Kinjo . |
| 4,570,188 | 2/1986 | Ichiyanagi ............ 358/906 |
| 4,599,657 | 7/1986 | Kaji et al. . |
| 4,604,668 | 8/1986 | Lemelson . |
| 4,691,252 | 9/1987 | Okada et al. ............ 358/906 |
| 4,691,253 | 9/1987 | Silver . |
| 4,692,815 | 9/1987 | Kawahara et al. . |
| 4,731,677 | 3/1988 | Mino et al. ............ 358/906 |
| 4,740,828 | 4/1988 | Kinoshita . |
| 4,746,993 | 5/1988 | Tada . |
| 4,758,905 | 7/1988 | Okada et al. . |
| 4,763,204 | 8/1988 | Kinoshita et al. . |
| 4,783,707 | 11/1988 | Nemoto et al. . |
| 4,792,861 | 12/1988 | Kawase et al. . |
| 4,802,020 | 1/1989 | Miyake et al. . |
| 4,819,093 | 4/1989 | Okada et al. ............ 358/909 |
| 4,825,324 | 4/1989 | Miyake et al. . |
| 4,858,031 | 8/1989 | Fukuta . |
| 4,949,199 | 8/1990 | Yunoki ............ 358/906 |

FOREIGN PATENT DOCUMENTS 0186883 7/1986 European Pat. Off. .

Primary Examiner—Donald McElheny, Jr.
Attorney, Agent, or Firm—Frishauf, Holtz, Goodman & Woodward

[57] ABSTRACT

An electronic still camera includes a section for converting an optical image, formed by an optical system, into electronic image signals by, and for recording the electronic image signals on a recording medium such as a magnetic disk, and a section for reproducing image data recorded on the recording medium and producing a composite video signal. The composite video signal is connected to a video terminal of a home television receiver through a cable, and reproduced and displayed on it.

16 Claims, 12 Drawing Sheets

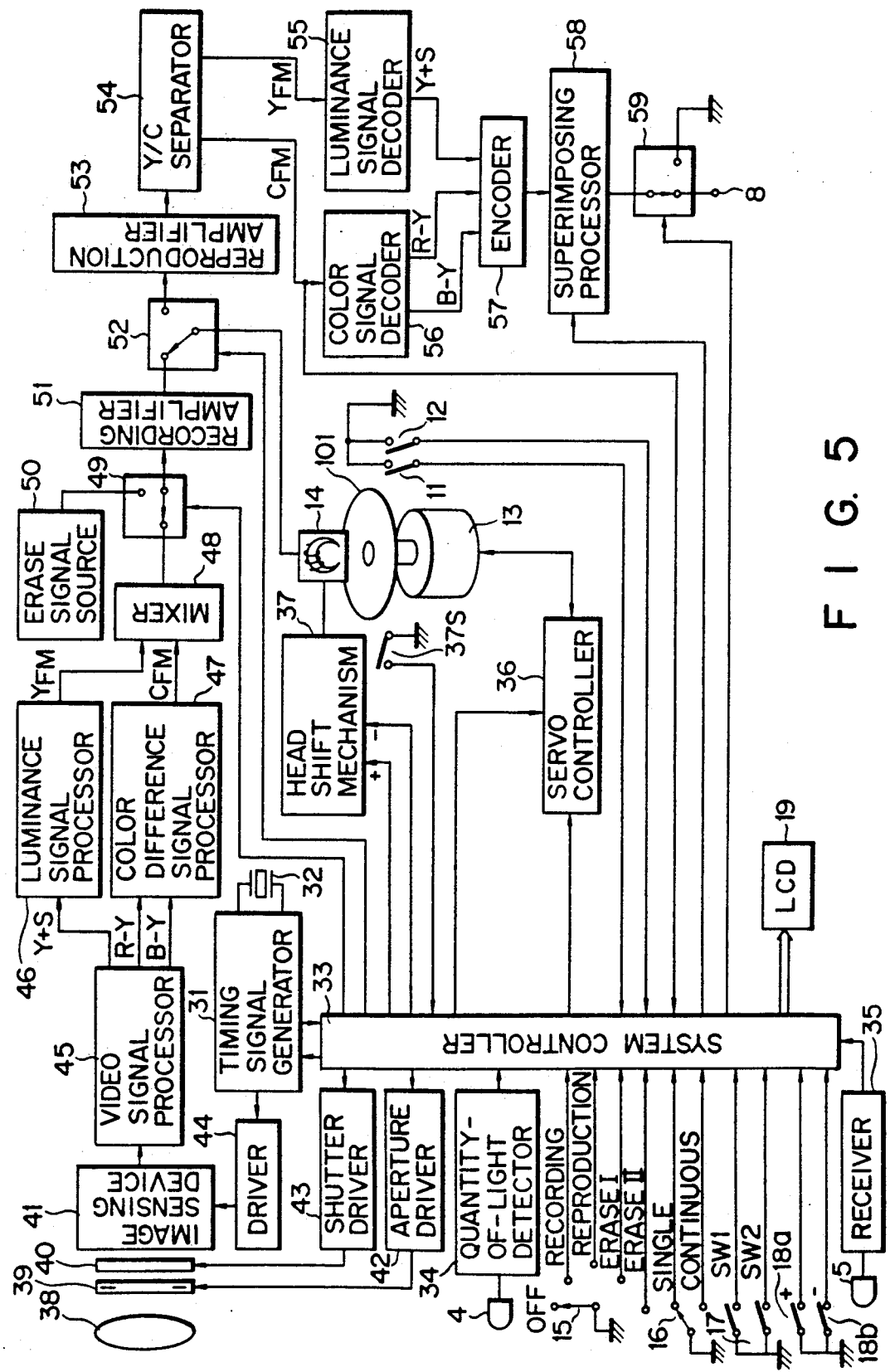
F I G. 5

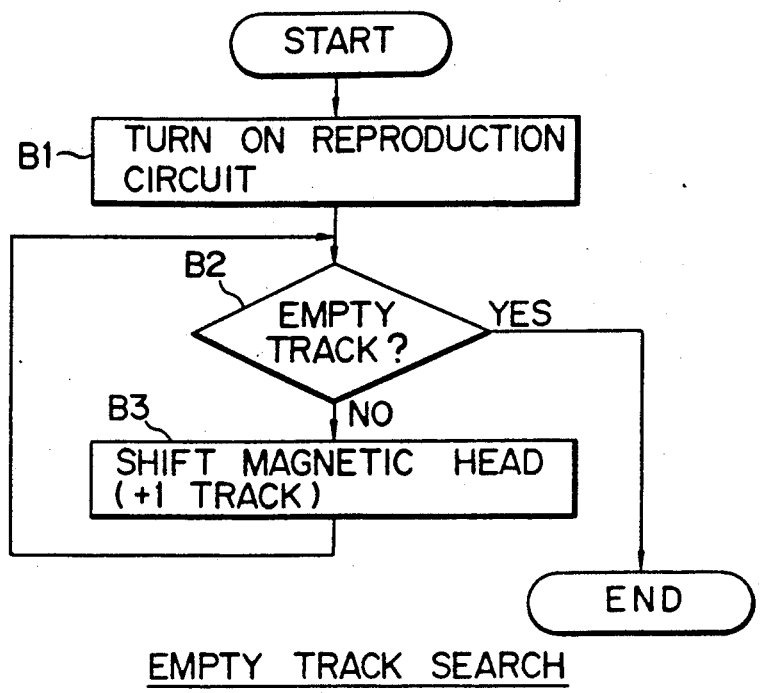
EMPTY TRACK SEARCH
F I G. 7
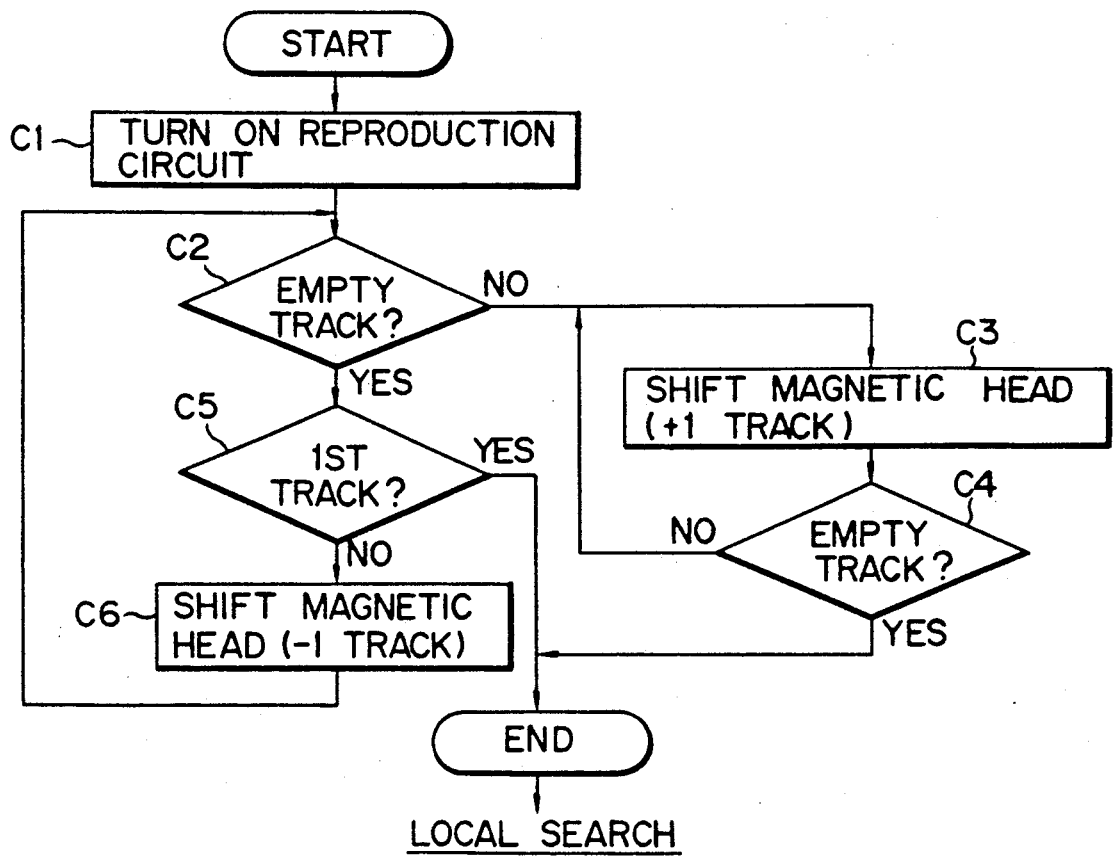
LOCAL SEARCH
F I G. 8

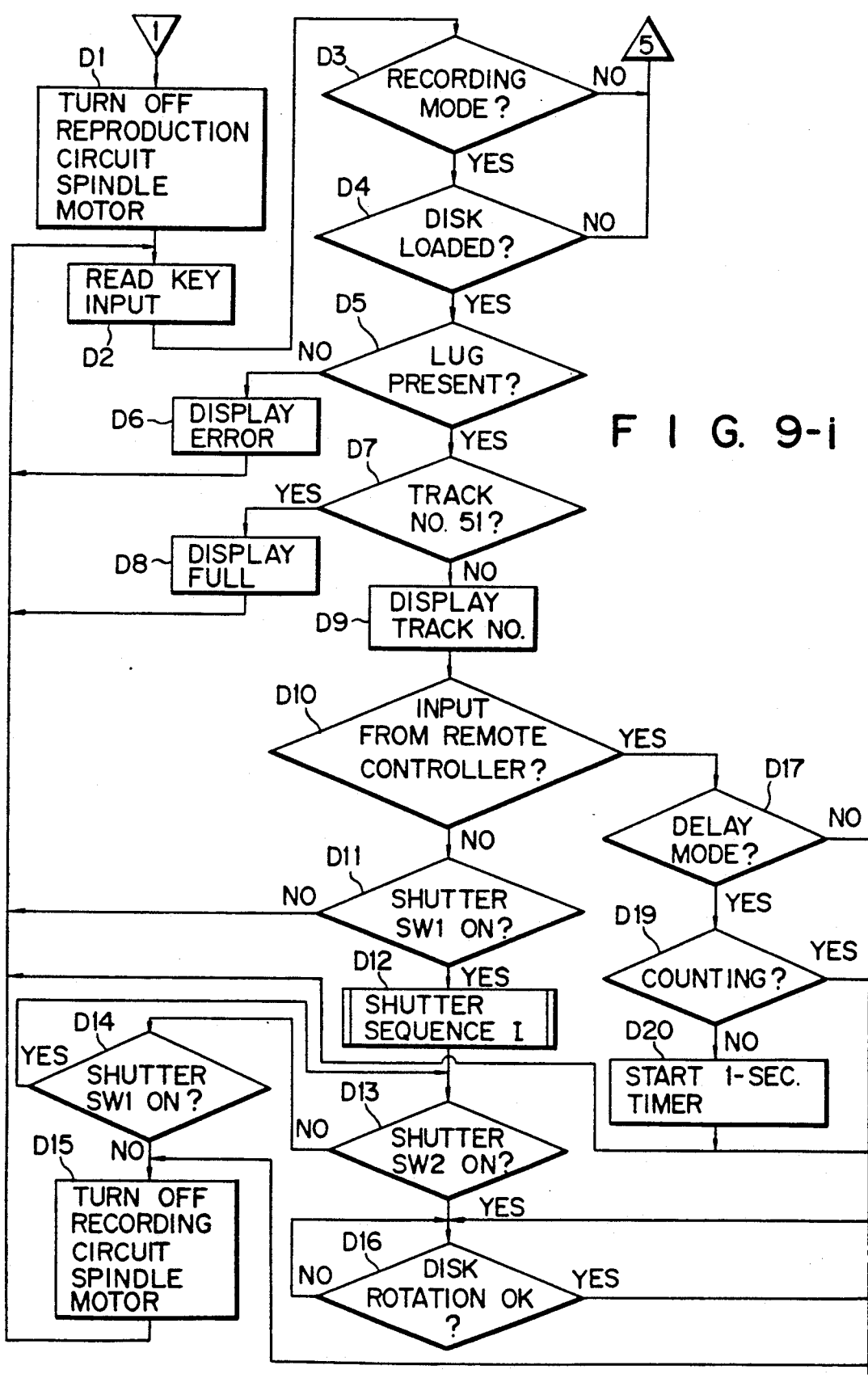
FIG. 9-i

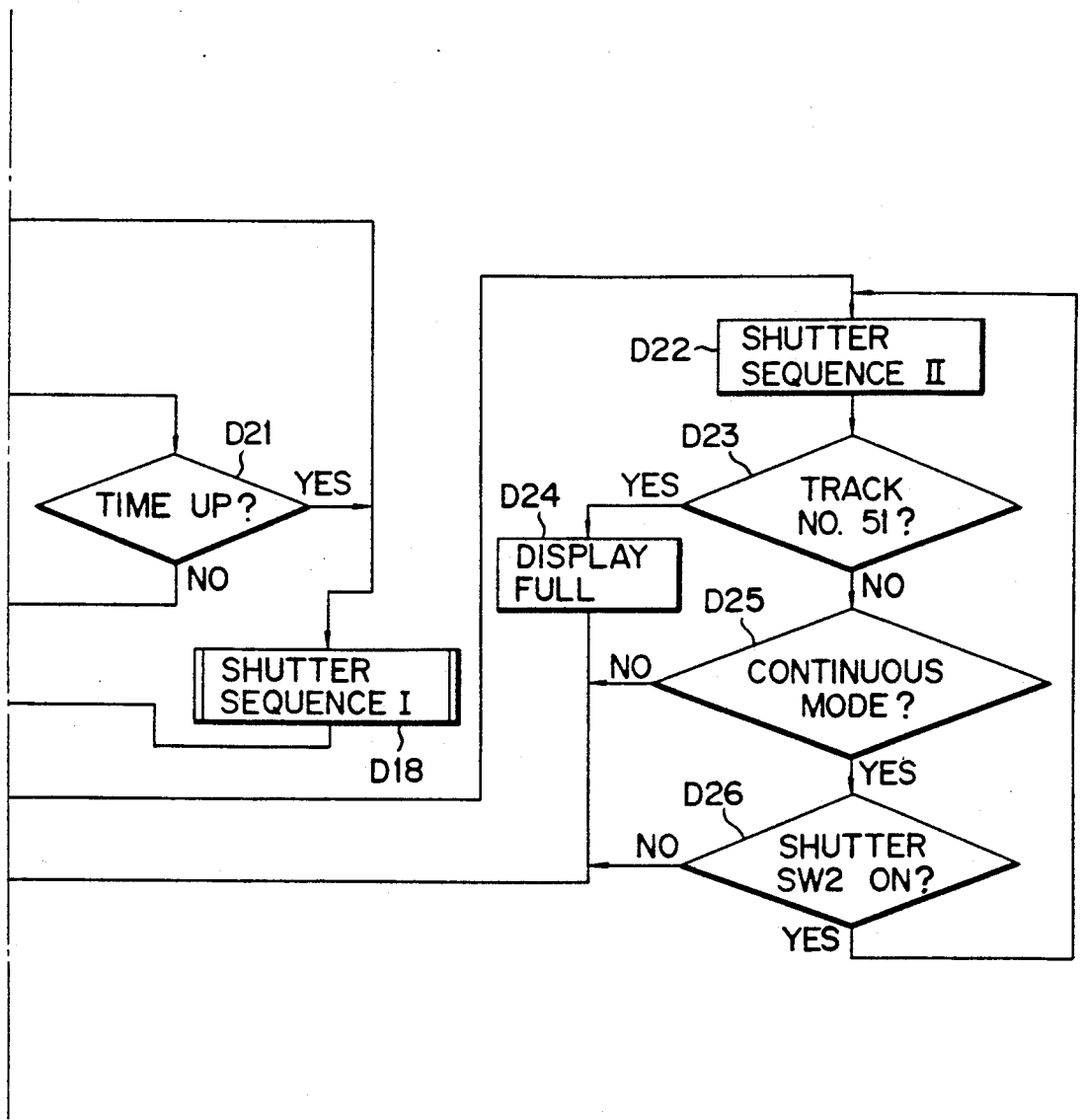
FIG. 9-ii

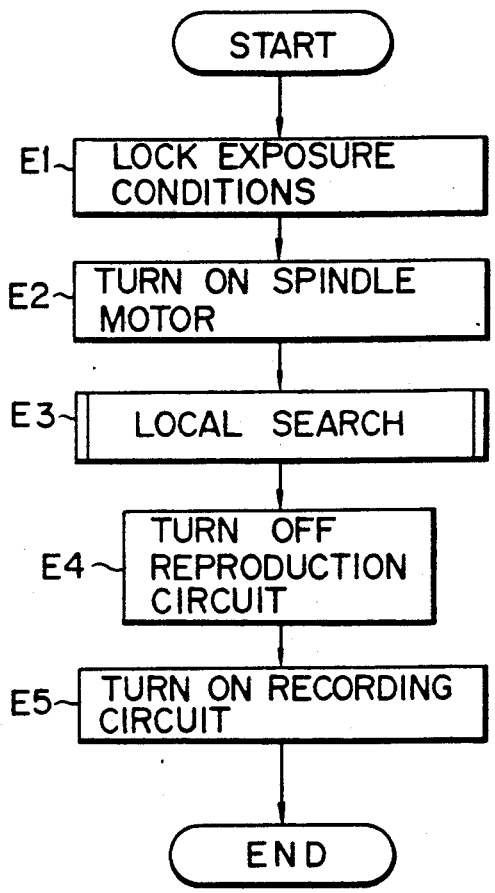
SHUTTER SEQUENCE I
F I G. 10
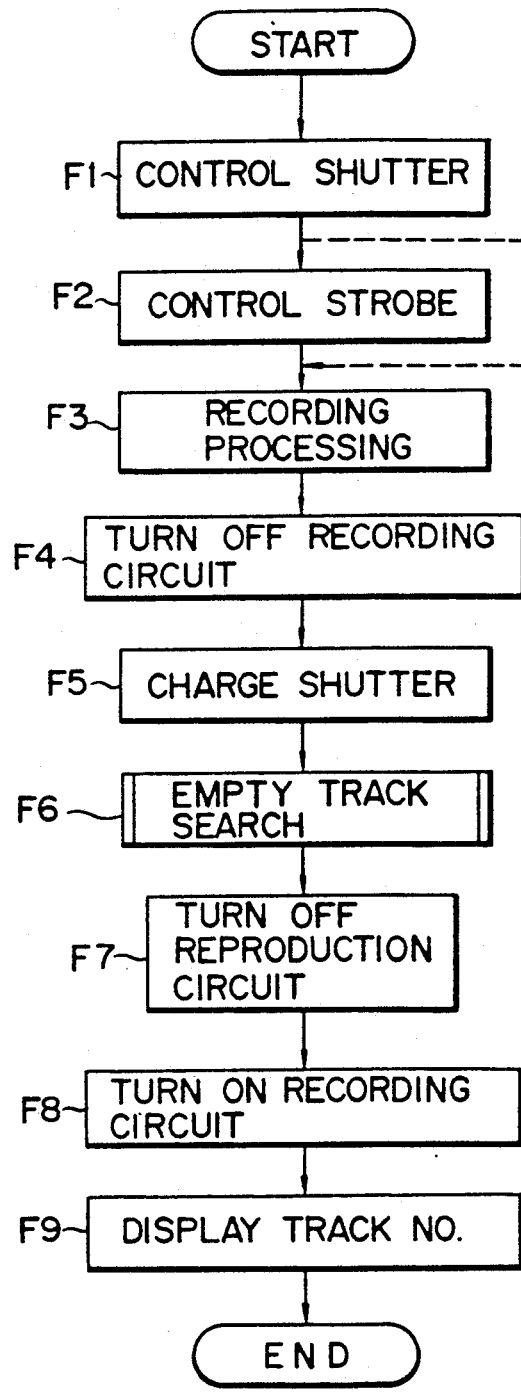
SHUTTER SEQUENCE II
F I G. 11

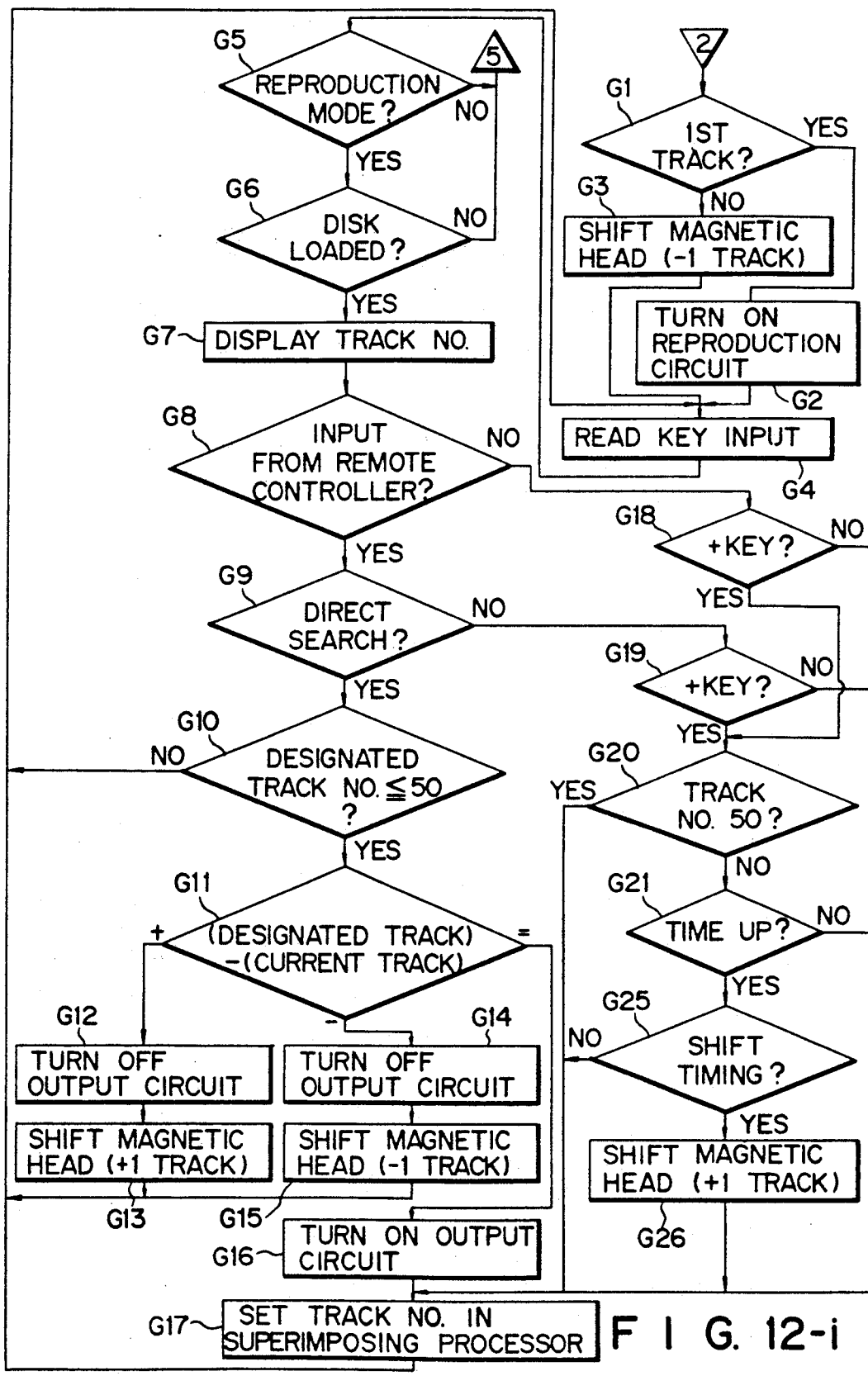
FIG. 12-i

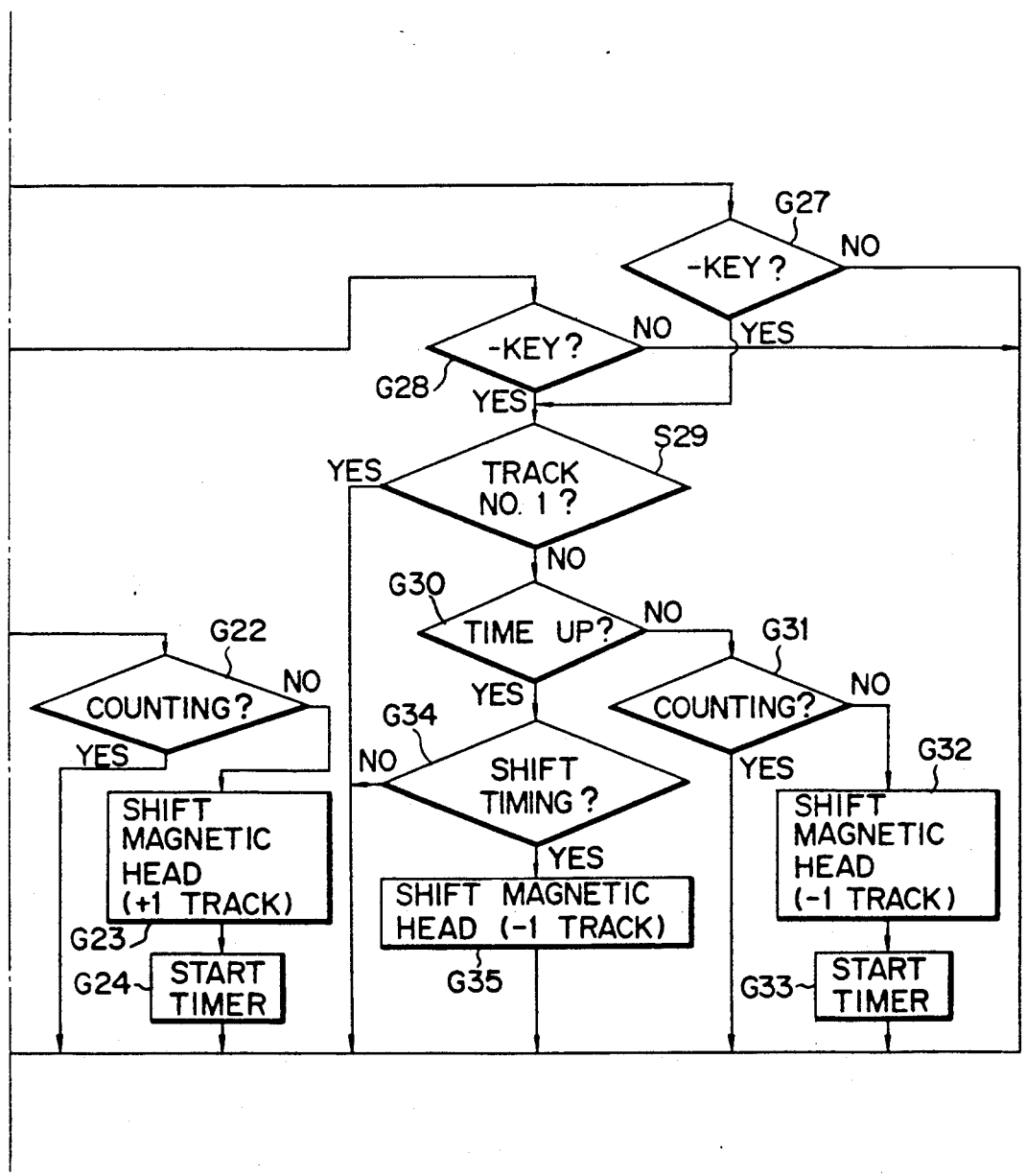
FIG. 12-ii

ELECTRONIC STILL CAMERA

This application is a division of application Ser. No. 07/412,924, filed Sept. 26, 1989, now abandoned, which is a division of application Ser. No. 07/131,662 filed on Dec. 11, 1987, abandoned.

BACKGROUND OF THE INVENTION

The present invention relates to an electronic still camera that converts an optical image formed by an optical system into an electronic image signal with a solid state image sending device having a CCD (charge coupled device) and related components, and the resulting electronic image signal is recorded on a recording medium such as a magnetic disk.

An electronic still camera which converts an optical image into an electronic image signal and records the electronic image signal on a recording medium such as a magnetic disk is disclosed in U.S. Pat. No. 4,057,830, U.S. Pat. No. 4,366,501, U.S. Pat. No. 4,599,657, and U.S. Pat. No. 4,783,707. In a prior art electronic still camera of this type, the magnetic disk is driven by a DC motor or the like. Since, therefore, the power consumption of the camera is large, the battery cannot be used for a long time. In order to use the battery for the longest possible time, the following method has been proposed by the prior art. In a single mode, wherein only one still image is recorded, the motor is started each time the shutter switch is operated and is stopped after the corresponding still image is recorded. In a continuous mode, wherein a number of still images are successively recorded at predetermined time intervals, the motor is started in synchronization with the start of the operation of the shutter switch. Then, while the shutter switch is being operated, the motor is kept driven and a number of still images are recorded at predetermined time intervals. When the operation of the shutter switch is stopped, the motor is stopped.

However, the above method is disadvantageous for at least the following two reasons: First, it is likely that the shutter switch will be kept operated even after a still image is recorded in all recording areas of the recording medium. Since the shutter switch is likely to be kept operated nevertheless, the motor is maintained in a driven state and power is wasted. Second, if the motor is kept driven, the user may be led by the resulting sound to mistakenly think that the camera is recording a still image on the recording medium even after this recording is actually finished.

To solve these problems, the prior art provides a mechanical switch or the like at a position in the vicinity of the last one of the recording areas of the recording medium. The mechanical switch detects a recording head if this recording head comes to the recording position, and simultaneous with this detection, the entire still camera is automatically turned off.

Although this method solves the problems mentioned above, it gives rise to the following inconveniences and shortcomings. The user has to operate the power source switch to turn on the camera each time he or she uses the camera. Let it be assumed that the camera has a monitor display capable of showing a still image recorded on the recording medium. If the mechanical switch automatically turns off the power source, when the monitor display is again powered up it cannot immediately show the still image. Also, the method is disadvantageous in the case where the recording medium has a free storage area preceding the storage area on which the first still image is to be recorded in the continuous mode. In this case, a still image cannot be speedily recorded on the free storage area after the recording of still image data is finished in the continuous mode. It should be further noted that an electronic still camera requires initial processing after the power source is turned on. For instance, the electronic still camera has to detect whether or not the recording medium is located at the predetermined position, and to move the recording head to the predetermined position. In other words, a finite time is required for the electronic still camera to be set in a standby condition after the power source is turned on. Therefore, if the power source of the electronic still camera is turned off, as in the method noted above, the user has to wait for the initial processing to be completed after he or she turns on the power source again.

SUMMARY OF THE INVENTION

The present invention has been developed in consideration of the above-mentioned disadvantages of the prior art, and its primary object is to provide an electronic still camera which minimizes power consumption by suitably controlling the driving of a recording medium (e.g., a magnetic disk), to thereby permit the battery to be used for a long time.

To achieve this object, the present invention provides an electronic still camera having recording medium housing means for housing a disk-type recording medium having a number of recording tracks on which still image data is recorded. Rotation driving means rotatively drives the disk-type recording medium housed in the recording medium housing means. Recording/reproduction head means records the still image data on the recording medium and reproduces the still image data recorded on the recording medium. Head control means shifts the head means in the radial direction of the recording medium. Initial operation-performing means performs a predetermined operation when the power source switch means is turned on. Mode switch select means selects a signal mode or a continuous mode. First recording control means causes the rotation driving means to start a rotation driving operation when the shutter switch means operates, with the single mode being selected by the mode select means, and it causes the recording/reproduction head means to record the still image data in only one of the recording tracks and to stop the rotation driving operation performed by the rotation driving means after the recording of the still image data. Second recording control means causes the rotation driving means to start the rotation driving operation when the shutter switch means operates, with the continuous mode being selected by the mode select means, and it causes the head control means to sequentially shift the recording/reproduction head means at predetermined time intervals and to sequentially record the still image data in the shifted recording tracks. Rotation driving operation ending means automatically stops the rotation driving operation performed by the rotation drive means after still image data is recorded on the last track, thereby ending the recording operation performed by the second recording control means. Reproduce means causes a reproduction of the still image data recorded on the recording medium.

With this construction, the driving of the motor is automatically stopped after data on still images successively taken is recorded on the last recording area of the recording medium. Therefore, the power consumption in the camera can be minimized. It should be noted that what is turned off after the data on the still images is recorded on the last recording area is not the power source but the driving of the motor. Therefore, the next operation the user wants (e.g., a reproduction operation) can be started immediately, and it is readily evident that the electronic still camera of the invention is conveniently designed.

BRIEF DESCRIPTION OF THE DRAWINGS

FIG. 5 is a block diagram showing the overall circuit arrangement of the present invention;

FIG. 7 is a flow chart showing the empty track search operation;

FIG. 8 is a flow chart showing the local search operation;

FIGS. 9-i and 9-ii are flow charts showing the operation in the recording mode;

FIG. 10 is a flow chart showing the operation of shutter sequence I;

FIG. 11 is a flow chart showing the operation of shutter sequence II;

FIGS. 12-i and 12-ii are flow charts showing the operation of reproduction mode;

DETAILED DESCRIPTION OF THE PREFERRED EMBODIMENT

An embodiment of the present invention will be described with reference to the accompanying drawings.

Figure 1:
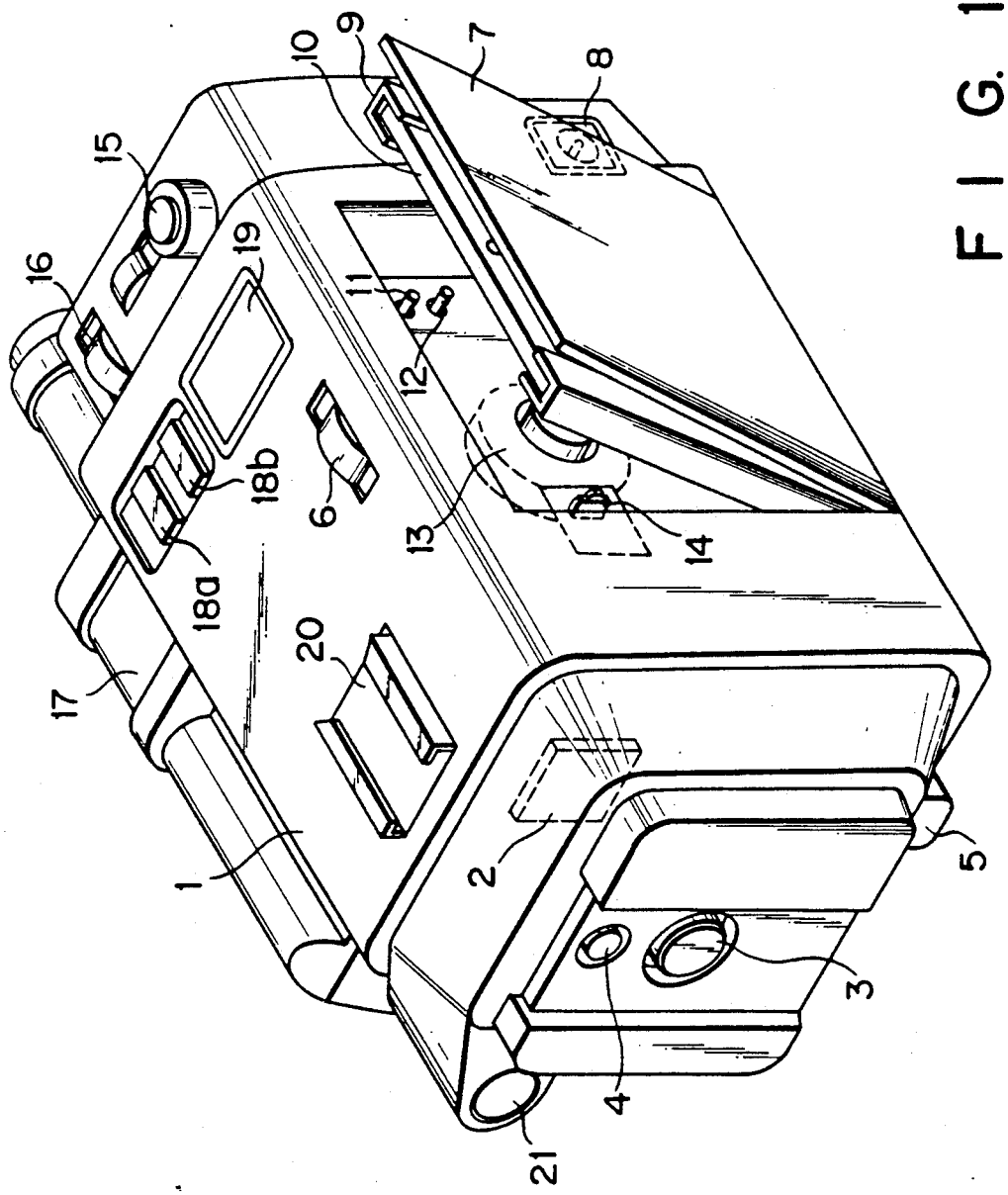
FIG. 1 shows an outer appearance of an electronic still camera, according to the present invention.

An electronic still camera of the embodiment uses a magnetic disk as a medium to record and retain an obtained image. FIG. 1 shows the outer appearance of the electronic still camera.

Figure 2:
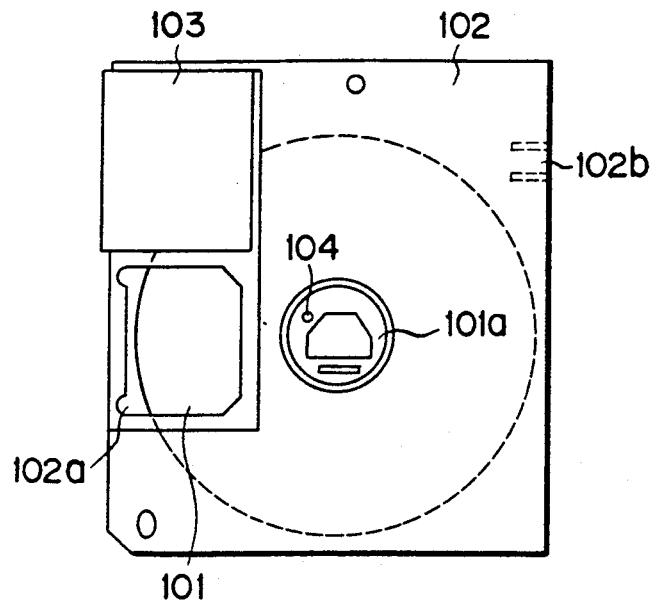
FIG. 2 is a plan view of a magnetic disk cartridge.

Referring to FIG. 1, reference numeral 1 denotes a camera housing. Photographing lens 3 for forming an optical image of an object on sensing device 2 provided in housing 1, photo-sensor 4 for detecting the quantity of light, and photo-sensor 5 for receiving an optical signal supplied by wireless remote controller 22, to be described later, are arranged on a front portion of housing 1. Cover 7 which is opened by eject switch 6, and connector terminal 8 for connection with external equipment such as a home television receiver are provided on the side portion of housing 1. Reference numeral 9 denotes a cartridge holder which appears/disappears when cover 7 is opened/closed. Cartridge 10 which accommodates a magnetic disk is set in holder 9. Magnetic disk cartridge 10 of this embodiment complies with the standards determined in "The Electronic Sill Camera Conference" attended by Japanese, American, and European camera and electric manufacturers in greater number. FIG. 2 schematically shows the arrangement of cartridge 10.

Referring to FIG. 2, reference numeral 101 denotes a magnetic disk; and 102, a cartridge case. Magnetic disk 101 has an outer diameter of about 47 mm and 52 tracks (track pitch: 0.1 mm; track width: 0.06 mm). In disk 101, the 1st outermost track to the 50th track are used for recording image data, whereas the 51st track is prohibited to be used, and the innermost 52nd track is used for recording a cue signal. Each track for recording image data can record 1-field image data of television signals of the NTSC (National Television Systems Committee) system. In field recording, a single magnetic disk can record image data corresponding to that of 50 frames of silver chloride film. Head window 102a is formed in cartridge case 102 to record image data on magnetic disk 101. Lug 102b is provided on the rear surface (corresponding to the recording surface of magnetic disk 101) of cartridge case 102. Slide shutter 103 closes window 102a. PG yoke 104 is provided on center hub 101a of disk 101.

When cover 7 is closed, magnetic disk cartridge 10, set in cartridge holder 9, is housed in camera housing 1. Detection switch 11 for detecting the presence/absence of magnetic disk cartridge 10, detection switch 12 for detecting whether lug 102b of cartridge 10 is cut, spindle motor 13 for driving magnetic disk 10, and magnetic head 14 for recording image data on disk 101 are provided in cartridge housing 1, as is shown in FIG. 1. Note that although it is not shown, a PG yoke detecting means for detecting the position of rotation of disk 101 is provided on the inner surface of cover 7.

Switches including main mode switch 15, shutter mode switch 16, shutter switch 17, and track control switches 18a and 18b, display 19 for displaying a track No. and the like, and base 20 for mounting a strobe thereon are provided on the top of housing 1. Main mode switch 15 is, e.g., a rotary switch and is used for switching and designating a mode among the recording, reproduction, erase I, and erase II modes. In erase mode I, image data recorded in a magnetic disk to be described later is erased in units of tracks (one track corresponds to one frame). In erase mode II, a plurality of recorded images, e.g., images recorded in all tracks, are continuously erased. Shutter made switch 16 selects a single mode for photographing each picture or a continuous mode. Shutter switch 17 is used for executing the photographing. Note that switch 17 also serves as an erase switch. Track control switches 18a and 18b are used for advancing and reversing the designated recording track of the magnetic disk by one track.

Figure 3:
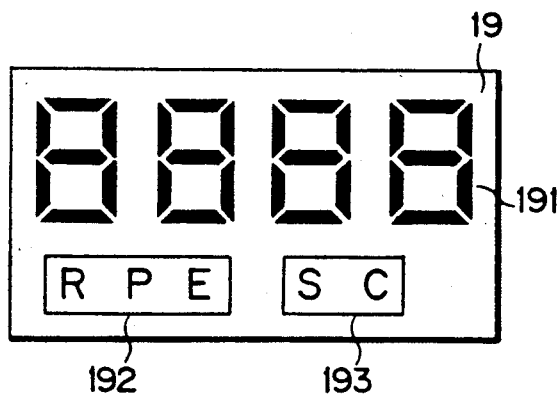
FIG. 3 shows an arrangement of a display section of an LCD.

Display 19 is, e.g., a liquid crystal display and comprises four seven-segment display elements, as shown in FIG. 3. Display 19 has numeral/character display section 191 for displaying a track No. and characters such as ERROR and OPEN, main mode display section 192 for displaying mode characters of R (recording), P (reproduction), and E (erase), and shutter mode display section 193 for displaying a mode character of S (single) and C (continuous).

Note that in FIG. 1 reference numeral 21 denotes an optical viewfinder.

Figure 4:
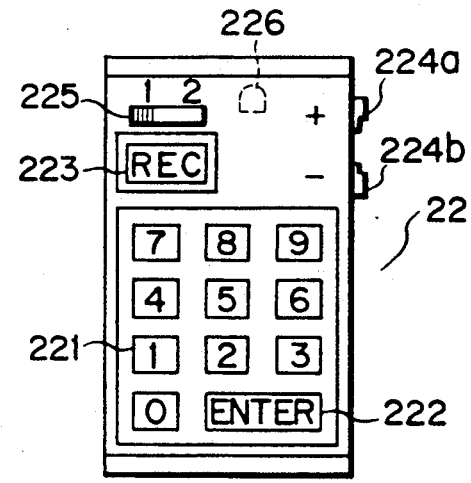
FIG. 4 shows a key arrangement of a remote controller.

FIG. 4 shows wireless remote controller 22 for supplying a control signal to photo-sensor 5, provided to the front portion of camera housing 1. Controller 22 has, as is shown in FIG. 4, ten keys 221 for designating a track No., enter key 222 for instructing a data input, recording key 223 for instructing a shutter operation, track control switch keys 224a and 224b for shifting a recording track, switch 225 for designating the delay mode of the shutter operation, and light-emitting diode 226 for outputting a control signal as an optical signal. Control signals, such as a track No. designating signal, a shutter operation signal and a recording track shifting signal, are output when keys 222, 223, 224a and 224b are operated, respectively. Switch 225 is a slide switch for selecting two switching positions ("1" and "2" in FIG. 4). If key 223 is operated when switch 222 is at a position "1", the shutter is operated immediately; if key 223 is operated when switch 225 is at position "2", the shutter is operated after the lapse of a predetermined time period. The delay mode is used when the operator of remote controller 22 wishes to take a picture of himself and does not desire it to be taken while he is operating controller 22.

The circuit system of this embodiment will be described.

FIG. 5 shows the entire arrangement of the circuit system. Referring to FIG. 5, reference numeral 31 denotes timing signal generator 31. Generator 31 generates various timing signals using quartz oscillator 32, and outputs the timing signals to system controller 33 and other circuit components. Note that generator 31 is reset by a detection signal, supplied from a PG yoke detecting means (not shown) described above, so that rotation of magnetic disk 101 is synchronized with the driving of image sensing device 41 to be described later. Controller 33 is connected to main mode switch 15, shutter mode switch 16, shutter switch 17, and track control switches 18a and 18b described above. Note that switch SW1 of shutter switch 17 is turned on when shutter switch 17 is half depressed, and switch SW2 thereof is turned on when switch 17 is fully depressed. Controller 33 receives a quantity-of-light signal from quantity-of-light detector 34 connected to photo-sensor 4, and a control signal such as a track No. designating signal supplied from controller 22 through remote control signal receiver 35.

System controller 33 supplies a control command to servo controller 36 in accordance with the operation of switches 15 and 17 provided in camera housing 1 or an instruction supplied by remote controller 22 in order to control spindle motor 13, and supplies a control command to a pulse motor in head shift mechanism 37, having a substantially similar structure to that of a known floppy disk drive mechanism (FDD), in accordance with an operation of switches 18a and 18b provided in camera housing 1 or an instruction supplied from remote controller 22, in order to shift magnetic head 14. Spindle motor 13 is rotated in accordance with a control command received from servo controller 36 mounted in camera housing 1. Upon reception of a command supplied by controller 33, head shift mechanism 37 shifts magnetic head 14 in order to write 1-field (1 frame) image data in one track of magnetic disk 101. First track detection switch 37S is provided to mechanism 37 for detecting if head 14 has shifted to the 1st track. A detection signal of switch 37S is supplied to controller 33 to preset a track counter provided in controller 33 to "1". Disk detection switch 11 for detecting presence/absence of a disk and lug detection switch 12 for discriminating presence/absence of lug 102b provided in magnetic disk cartridge 102 are provided on a loading portion of disk 101 in camera housing 1. Detection signals from switches 11 and 12 are supplied to controller 33. Controller 33 determines, based on the detection signal from switch 12, whether data can be written in or erased from disk 101.

System controller 33 is also connected to LCD 19 (liquid crystal display panel), described with reference to FIG. 3. Numeral/character display section 191 of LCD 19 displays a track No. and characters such as ERROR and OPEN, main mode display section 192 thereof displays R (recording), P (play or reproduction), or E (erase) mode, and shutter mode display section 193 thereof displays an S (single) or C (continuous) shutter mode.

Referring to FIG. 5, reference numeral 38 denotes an optical system comprising photographing lens 1 and the like shown in FIG. 1. External light incident on optical system 38 is focused on solid state image sensing device 41 comprising, e.g., a CCD and a MOS transistor, through aperture 39 and shutter 40. Sensing device 41 is identical with image sensing device 2 shown in FIG. 1. Aperture 39 and shutter 40 are driven by aperture and shutter drivers 42 and 43, respectively, which operate in accordance with commands supplied by system controller 33. Image sensing device 41 is driven by driver 44 which operates in accordance with a timing signal generated by timing signal generator 31. A video signal output from sensing device 41 is supplied to video signal processor 45. Processor 45 separates the video signal from sensing device 41 into luminance signal Y+S including a sync signal, color difference signals R−Y and B−Y, and supplies signals Y+S to luminance signal processor 46 and signals R−Y and B−Y to color difference processor 47. Processor 46 converts luminance signal Y+S into FM signal YFM and outputs it to mixer 48. Processor 47 processes signals R−Y and B−Y, converts the result into FM signal CFM, and outputs FM signal CFM to mixer 48. Mixer 48 mixes output signals YFM and CFM from processors 46 and 47, respectively, and outputs the result to recording/erase switching circuit 49. Switching circuit 49 selects an output signal from mixer 48 or an erase signal from erase signal source 50 in accordance with a switching signal supplied by system controller 33, and outputs the selected signal to magnetic head 14 through recording amplifier 51 and recording/reproduction switching circuit 52. Magnetic head 14 writes an image signal in or erases a recorded signal from magnetic disk 101. Switching circuit 52 selects recording amplifier 51 or reproduction amplifier 53 in accordance with a command from controller 33.

In the reproduction mode, an image signal recorded in magnetic disk 101 is reproduced by magnetic head 14 and supplied to reproduction amplifier 53 through recording/reproduction switching circuit 52. An output signal from amplifier 53 is supplied to YC separator 54 and separated into luminance FM signal YFM and color FM signal CFM. Luminance FM signal YFM is supplied to luminance signal decoder 55, and color FM signal CFM is supplied to system controller 33 and color signal decoder 56. Decoder 55 decodes luminance signal Y+S from luminance FM signal YFM and outputs it to encoder 57. Decoder 56 decodes color difference signals R−Y and B−Y from color difference FM signal CFM, and outputs them to encoder 57. Encoder 57 encodes signal Y+S decoded by decoder 55, and signals R−Y and B−Y decoded by decoder 56, and outputs to superimposing processor 58 a composite video signal that complies with the standards "RS-170A" of IEEE (Institute of Electrical and Electronics Engineers). In response to a signal from encoder 57, processor 58 synthesizes a selection track No. supplied by system controller 33, and outputs it to connector terminal 8 as is shown in FIG. 1 through output switching circuit 59. Connector terminal 8 is connected to a video terminal of a monitor (e.g., a home television receiver), a video printer, or the like by means of a cable. Output switching circuit 59 is controlled by system controller 33. During normal reproduction, switching circuit 59 selects an output signal from superimposing processor 58. When an arbitrary track No. is designated by remote controller 22 and the direct search is being performed, switching circuit 59 is switched to the ground-line side and holds the monitor display in a black level state. Color FM signal CFM supplied to controller 33 is used for empty track detection in an empty track search and a local search to be described later.

The operation of this embodiment will be described. Prior to using the camera, the user must switch main mode switch 15 from a power-off state to a desired mode position in order to designate an operation mode, and operates switches in accordance with the selected operation mode. More specifically, when the operator wishes to take a picture, he designates a recording mode with main mode switch 15 and a single or continuous mode with shutter mode switch 16. Then, he pans the camera, positioning it on the desired object and operates shutter switch 17. When he wishes to reproduce an image recorded on magnetic disk 101, he designates a reproduction mode with switch 15 and a track No., in which the image to be reproduced is recorded, with track control switches 18a and 18b. When he wishes to erase an image recorded on magnetic disk 101, he designates erase mode I or II with switch 15 and operates shutter switch 17.

Figure 6:
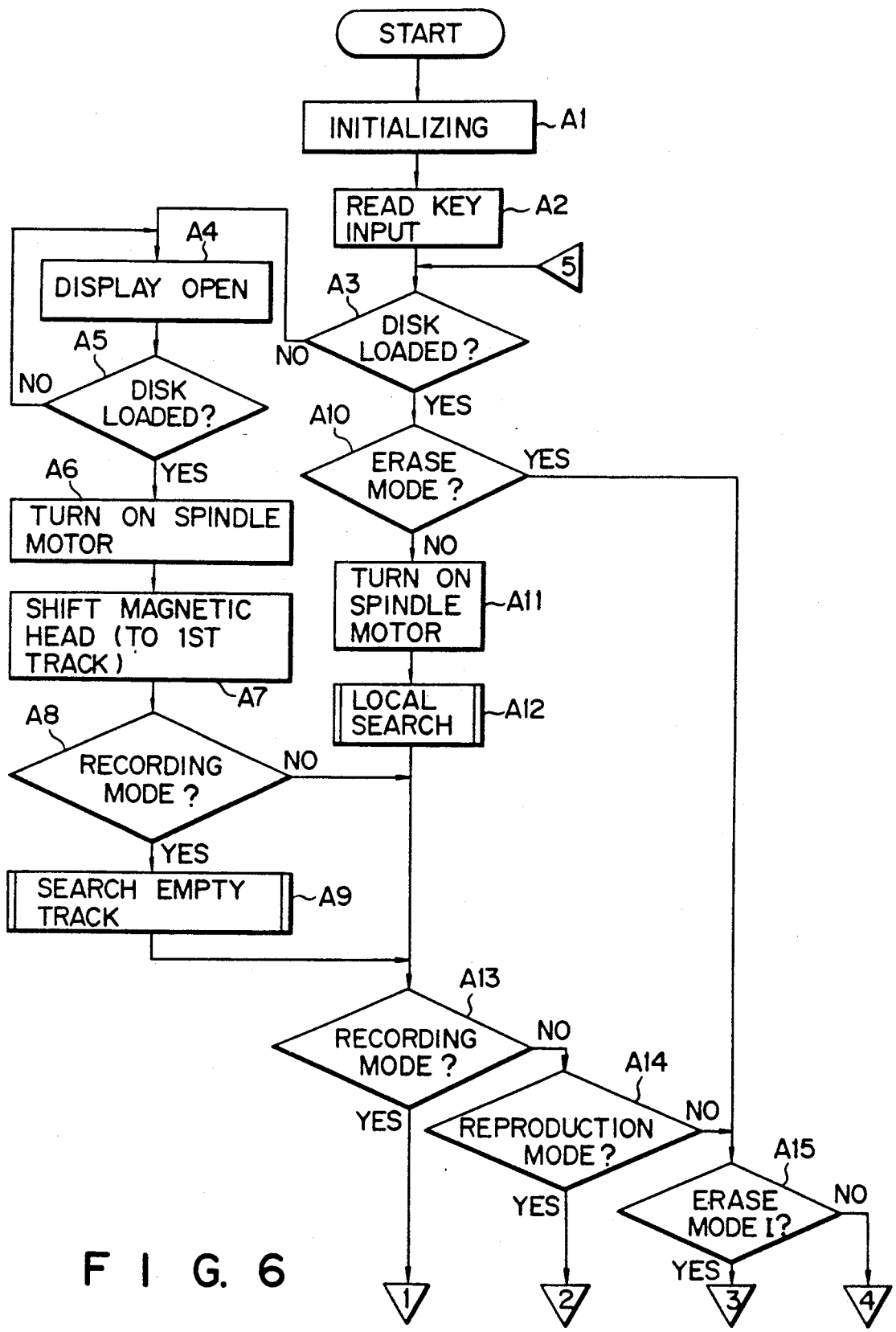
FIG. 6 is a flow chart of a main flow for explaining the operation of the present invention.
Figure 13:
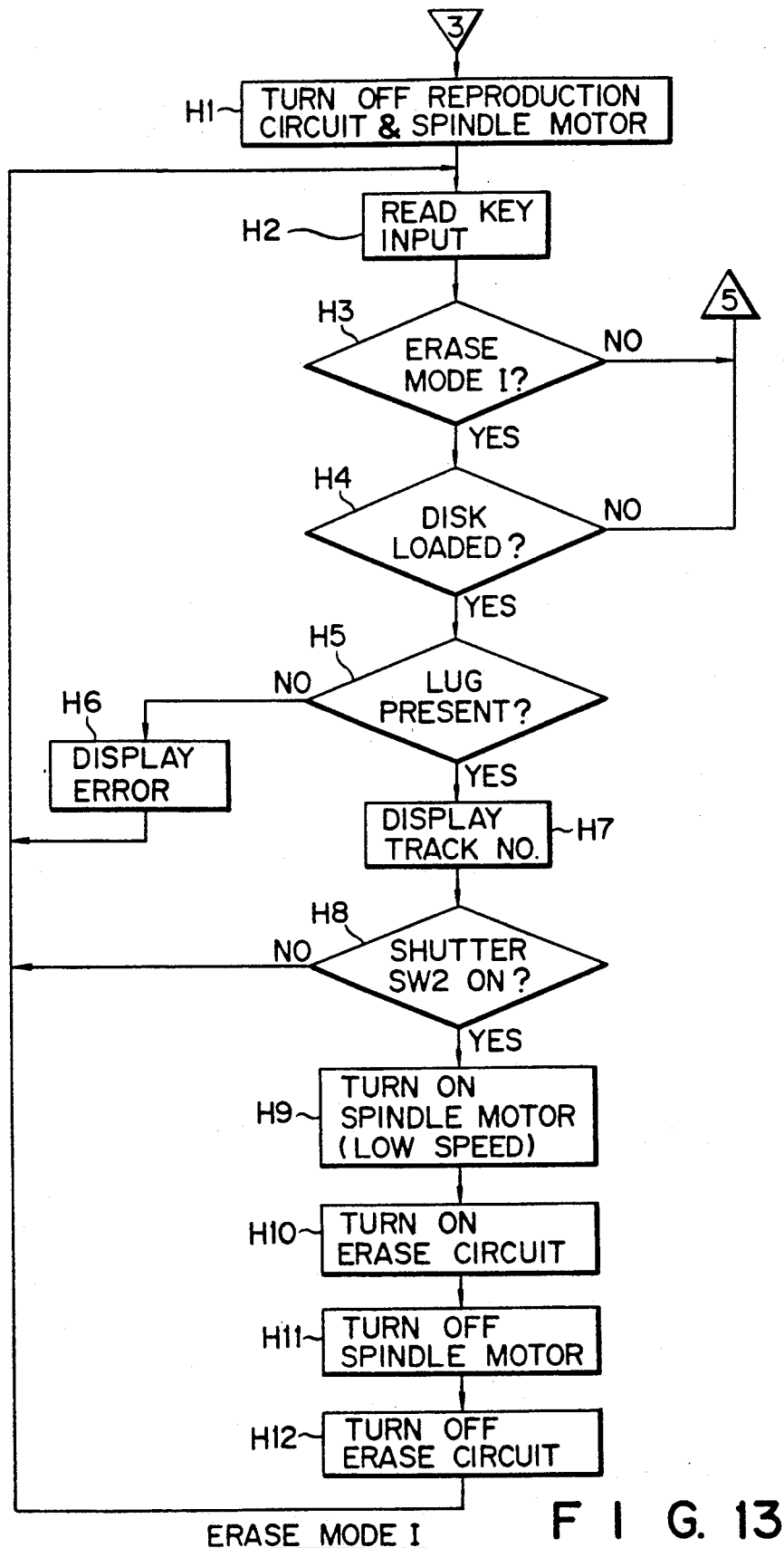
FIG. 13 is a flow chart showing the operation of erase mode I.
Figure 14:
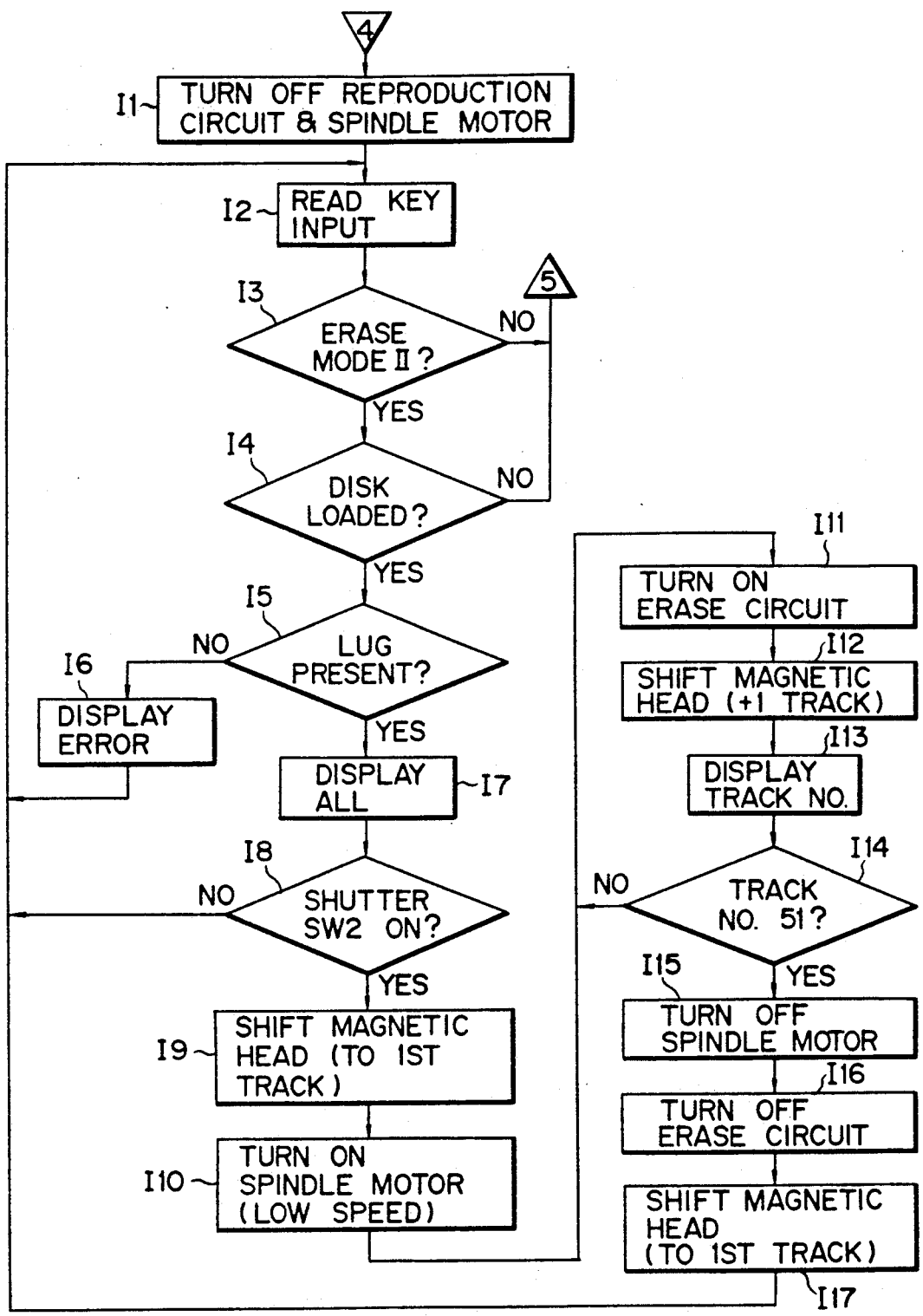
FIG. 14 is a flow chart showing the operation of erase mode II.

In accordance with the various key operations described above, processing, shown in the flow charts of FIGS. 6 to 14, is executed. More specifically, when main mode switch 15 designates a desired operation mode, the power source is turned on and processing as shown in the flow chart of FIG. 6 is executed by system controller 33. When the power source is turned on, initialization is performed by controller 33 (step A of FIG. 6), and a key input is read (step A2). It discriminates whether or not magnetic disk 101 is loaded based on a detection signal from disk detection switch 11 (step A3). If NO, the flow advances to step A4 and characters "OPEN" are displayed on LCD 19, informing the user that disk 101 is not loaded. Then, in step A5, it checks again whether disk 101 is loaded. If NO, the flow returns to step A4 and characters "OPEN" are continuously displayed. When disk 101 is loaded in this state, the flow advances from step A5 to step A6. A drive command is supplied to servo controller 36 from system controller 33 to drive spindle motor 14 at a predetermined speed (3,600 rpm in the NTSC system and 3,000 rpm in the PAL system). In step A7, a control command is supplied from controller 33 to head shift mechanism 37 to shift magnetic head 14 to the 1st track of disk 101. The shift of head 14 to the 1st track is detected by 1st track detection switch 37S. Thereafter, whether the recording mode is set or not is determined from the state of main mode switch 15 (step A8). If YES, the flow advances to step A9 and an empty track search (to be described later in detail) is executed.

When it is determined in step A3 that magnetic disk 101 is loaded, the flow advances to step A10 to discriminate whether or not the erase mode is set. If NO, the flow advances to step A11 and spindle motor 13 is driven at the above-described speed. Thereafter, local search (to be described later in detail) is executed in step A12.

If NO in step A8, if empty track search is completed in step A9, or if local search in step A12 is completed, the flow advances to step A13 and it is discriminated whether the recording mode is set. If YES in step A13, processing of the recording mode (to be described later in detail) is executed; if NO, the flow advances to step A14 and it is discriminated whether the reproduction mode is set. If YES in step A14, processing of the reproduction mode (to be described later in detail) is executed; if NO, the flow advances to step A15 and it is discriminated whether erase mode I is set. This discrimination is also performed if YES in step A10. If YES in step A15, processing of erase mode I (to be described later in detail) is executed; if NO, processing of erase mode II (to be described later in detail) is executed.

Empty track search of step A9, local search of step A12, and processing of recording, reproduction, and erase (erase modes I and II) will be described in detail.

FIG. 7 shows processing of empty track search of step A9 in detail. In step B1, recording/reproduction switching circuit 52 is switched to the reproduction amplifier 53 side, and the power source of the reproduction circuit system (53 to 58) is turned on. Subsequently, it is determined in step B2 whether the currently designated track is an empty track (if color FM signal CFM is not supplied from YC separator 54, it is an empty track). If NO in step B2, magnetic head 14 is advanced for one track in step B3, and then the flow returns to step B2. The operations of steps B2 and B3 are then repeated to advance head 14 to the position of an empty track, thus completing empty track search.

FIG. 8 shows local search of step A12 of FIG. 6 in detail. First, recording/reproduction switching circuit 52 is switched to the reproduction amplifier 53 side in step C1, and simultaneously the power source of the reproduction circuit system is turned on. Subsequently, the flow advances to step C2 to determine whether the currently designated track is an empty track. If NO, the flow advances to step C3 to advance head 14 for one track. Thereafter, it is determined in step C4 whether the current track is an empty track. If NO, the flow returns to step C3. The operations of steps C3 and C4 are repeated to advance head 14 to the position of an empty track, thus completing empty track search. However, if YES in step C2, the flow advances to step C5 to determine whether the current track is the 1st track. If YES, local search is ended; if NO, the flow advances to step C6 to reverse head 14 by one track, and the flow returns to step C2. If all the tracks of magnetic disk 101 are empty tracks, the operations of steps C2, C5, and C6 are repeated so that head 14 is returned to the 1st track, thus completing processing. However, if an image-recorded track is detected while head 14 is being returned to the 1st track, the flow advances to step C3 from C2 to shift head 14 by one track. The step C4 for discriminating an empty track is executed and local search is ended. From the above processing, if it is determined that all the tracks are empty tracks, head 14 is shifted to the 1st track; otherwise, head 14 is shifted to the first empty track.

The operation for recording a photographed image on magnetic disk 14 will be described in accordance with the flow chart of FIGS. 9-i and 9-ii. When the flow enters the recording mode processing flow of FIG. 9 from step A13 in FIG. 6, recording/reproduction switching circuit 52 is switched to the recording amplifier 51 side in step D1 to turn off the power source of the reproduction circuit system and simultaneously spindle motor 13. Key input is read in step D2. Thereafter, the flow advances to step D3 to determine whether the recording mode is set. If NO, the flow advances to step A3 of FIG. 6; if YES, it is determined whether magnetic disk 101 is loaded. If NO, the flow returns to step A3 from step D4; if YES, the flow advances to step D5 and it is discriminated by a signal supplied from lug detection switch 12 whether lug 102b is present in disk cartridge 10. If NO, recording in magnetic disk 101 is inhibited. Therefore, characters "Err" (error) are displayed on LCD 19 in step D6, and the flow returns to step D2. If YES in step D5, the flow advances to step D7 and it is discriminated whether the count of the track counter provided in system controller 33 has reached "51". If YES, images are recorded in all the tracks. Therefore, the flow advances to step D8 and characters "FULL" are displayed on LCD 19. Then, the flow returns to step D2. However, if NO, in step D7, the flow advances to step D9 from step D7 to display the track No. on LCD 19, and it is discriminated in step D10 whether an input is supplied from remote controller 22. If NO, the flow advances to step D11 and it is discriminated whether switch SW1 is turned on by the operation of shutter switch 17. If NO, the flow returns to step D2; if YES, the flow advances to step D12 and shutter sequence I (to be described later in detail) is executed. Then, the flow advances to step D13 and it is discriminated whether switch SW2 is ON by the operation of switch 17. If NO, it is discriminated in step D14 whether switch SW1 is ON. If YES, the flow returns to step D13, and steps D13 and D14 are repeated until switch SW2 is turned on. In this case, if a half-depression of switch 17 is released, this state is detected in step D14. The power source of the recording circuit system (45 to 51) and simultaneously spindle motor 13 are turned off in step D15, and the flow returns to step D2. However, if switch 17 is fully depressed, switch SW2 is turned on, and the flow advances to step D16 from step D13 to determine whether the rotation of magnetic disk 101 has reached a stable state. If NO, a stable state is waited. Note that whether the rotation of disk 101 has reached a stable state is determined in accordance with whether the reset cycle of timing signal generator 31 by detecting from PG yoke detecting means falls within a predetermined time range.

If YES in step D10, the flow advances to step D17 to discriminate whether the delay mode is set by switch 225. If NO, shutter sequence I of step D18 is executed and the flow advances to step D16; if YES, the flow advances to step D19 from step D17 and it is discriminated whether a delay time timer to be described later is counting a delay time. At first, counting has not yet started. Therefore, the flow advances to step D20 to start a timer, incorporated in system controller 33, for counting, e.g., 1-sec. delay time, and the flow returns to step D2. After the 1-sec. timer is started, YES is obtained in step D19. Therefore, the flow advances to step D21 to discriminate whether the time is up. If NO, the flow returns to step D2. When the 1-sec. timer has finished counting, the flow advances to step D18 from step D21 to execute shutter sequence I. Thereafter, the flow advances to step D16, as described above.

In step D16, it is discriminated whether the rotation of magnetic disk 101 is in a stable state. If YES, shutter sequence II of step D22 is executed, and the obtained image is recorded on disk 101. When shutter sequence II is completed, it is discriminated in step D23 whether the count of the track counter has reached "51". If YES, characters "FULL" are displayed on LCD 19 in step D24; if NO, it is discriminated in step D25 whether the continuous mode is set. If NO, the flow advances to step D15 to turn off the recording circuit system and spindle motor 13; if YES, it is discriminated in step D26 whether shutter switch SW2 is ON. If YES, the flow returns to step D22 to execute shutter sequence II, and the photographed image is recorded on magnetic disk 101. While shutter switch SW2 is ON, operations of steps D22 to D26 are repeated, and photographing is continuously performed every predetermined time interval, e.g., every ¼ sec. The time interval can be controlled if, e.g., a ¼-sec. timer is provided in system controller 33 and started in synchronism with shutter control of shutter sequence II to be described later, and if photographing is performed when the timer is up. When shutter switch SW2 is turned off, it is determined that photographing has ended. The flow advances to step D15 from D26 to turn off the recording circuit system and spindle motor 13. Thereafter, the flow returns to step D2 to wait for a subsequent shutter operation.

FIG. 10 shows shutter sequence I of steps D12 and D18 of FIGS. 9-i and 9-ii in more detail. In shutter sequence I, a signal supplied from quantity-of-light detector 34 is fetched by system controller 33 in step E1. The aperture value and shutter speed are calculated based on quantity-of-light from detector 34 in accordance with a predetermined program, and the obtained exposure conditions (aperture value and shutter speed) are locked. A control signal is supplied from system controller 33 to aperture driver 42 in order to set aperture 39 to be an aperture value based on the locked exposure conditions. Then, the flow advances to step E2 to turn on spindle motor 13. In step E3, local search shown in FIG. 8 in detail is executed to search an empty track. The flow advances to step E4 to turn off the reproduction circuit system. In step E5, the recording circuit system is turned on and shutter sequence I is ended.

FIG. 11 shows shutter sequence II of step D22 of FIG. 9-ii in more detail. In shutter sequence II, a control signal is supplied from system controller 33 to shutter driver 43 in order to drive shutter 40 at a shutter speed corresponding to the exposure conditions set in shutter sequence I. In this case, if a strobe is used, the strobe is controlled in step F2 and the flow advances to step F3. If a strobe is not used, the flow jumps to step F3 immediately from step F1 to perform recording. More specifically, when shutter 40 is released by shutter driver 43 in step F1, external light is incident on optical system 38 and focused on image sensing device 41 through aperture 39. Sensing device 41 converts the optical image into an electrical video signal and outputs it to video signal processor 45. Processor 45 separates the video signal into luminance signal Y+S including a sync signal and color difference signals R−Y and B−Y, and supplies signal Y+S to luminance signal processor 46 and signals R−Y and B−Y to color difference signal processor 47. Processors 46 and 47 converts luminance signal Y+S and color difference signals R−Y and B−Y into FM signals YFM and CFM, respectively. Signals YFM and CFM are mixed by mixer 48 to obtain an FM image signal. The FM image signal is output to recording amplifier 51 through recording/erase switching circuit 49. The FM image signal amplified by amplifier 51 is supplied to magnetic head 14 through recording/reproduction switching circuit 52. The image signal is recorded at a designated track of magnetic disk 101 by head 14.

When 1-frame image signals obtained by image sensing device 41 are recorded, the flow advances to step F4 to turn off the recording circuit system. The shutter is charged in step F5. The flow then advances to step F6 to perform empty track search (described in detail in FIG. 7). Then, the reproduction circuit system is turned off in step F7 and the recording circuit system is turned on in step F8. The No. of the empty tracks searched in step F6 is displayed in step F9 on LCD 19, thus completing shutter sequence II.

The reproduction operation will be described. When an image recorded on magnetic disk 101 is to be reproduced, the reproduction mode is designated by main mode switch 15, and the track Nos. are sequentially designated by the operation of track control switches 18a and 18b or by track control switches 224a and 224b of remote controller 22, or a desired track No. is directly designated by ten keys 221 of remote controller 22. When the reproduction mode is designated, the flow advances from step A14 of FIG. 6 to step G1 of FIGS. 12-i and 12-ii to discriminate whether the currently selected track is the 1st track. If YES, the flow advances to step G2 to turn on the reproduction circuit system, and a key input is read in step G4. If NO in step G1, magnetic head 14 is returned by one track in step G3, and the flow advances to step G4 to read the key input. The flow then advances to step G5 to discriminate whether the reproduction mode is set. If YES, it is discriminated in step G6 whether magnetic disk 101 is loaded. If NO in steps G5 and G6, the flow returns to step A3 of FIG. 6. If YES in step G6, the track No. is displayed on LCD 19 in step G7, and the flow advances to step G8 to discriminate whether an input is supplied from remote controller 22. If YES, the flow advances to step G9 to discriminate whether direct search is to be performed, i.e., whether a designated track is set by ten keys 221. If YES, it is discriminated in step G10 whether the designated track No. < 50. If NO, the flow returns to step G4. However, if YES in step G10, the flow advances to step G11 to subtract the current track No. from the designated track No. If the subtraction result is positive, that is, if the designated track No. is larger than the current track No., the flow advances to step G12 to switch output switching circuit 59 to the ground side, thus turning off the output circuit. That is, supply of a reproduction image signal to connector terminal 8 is stopped. Subsequently, magnetic head 14 is shifted by one track in step G13, and the flow returns to step G4 to repeat the above operations. If the subtraction result of step G11 is negative, that is, when the designated track No. is smaller than the current track No., the flow advances to step G14 to switch output switching circuit 59 to the ground side, thus turning off the output circuit. Then, head 14 is returned by one track in step G15. Thereafter, the flow returns to step G4 to repeat the above operations. By the processing of the steps G12 and G13 or steps G14 and G15, if the designated track No. coincides with the current track No., the flow advances to step G16 from step G11 to switch switching circuit 59 to the superimposing processor 58 side, thereby turning on the output circuit. Then, in step G17 system controller 33 sets the track No. in processor 58, and the flow returns to step G4. In this case, since the output circuit is ON, an image signal read out from the designated track on disk 101 by head 14 is reproduced by the reproduction circuit system, and a track No. is added to the reproduced signal by processor 58. The signal is then supplied to a home television receiver (not shown) via connector terminal 8 and displayed as an image on it. In this state, when a next track No. is designated, the recorded image of the designated track is read out by the above operation and displayed as an image.

On the other hand, if NO in step G8, the flow advances to step G18 to discriminate whether track control switch 18a (+ key) has been operated. If it is determined in step G9 that direct search is not performed, the flow advances to step G19 to discriminate whether track control switch 224a (+ key) of remote controller 22 has been operated. If YES in step G18 or G19, the flow advances to step G20 to discriminate whether the track No. is 50. If YES, the final track has already been reached and the following track is the forbidden 51th track. Therefore, the flow advances to step G17. If NO in step G20, the flow advances to step G21 to discriminate whether the delay time timer to be described later has been up. This discrimination is performed in order to switch and control the image reproduction operation in accordance with the operation time of track control switches 18a and 224a. In image reproduction of this embodiment, when switches 18a and 224a are operated for less than 2 seconds, magnetic head 14 is shifted by one track by a single switch operation and only the following image is reproduced. When switches 18a and 224a are continuously operated for 2 seconds or longer, head 14 is shifted over tracks every the same time interval as photographing in the continuous mode, that is, every timing of 4 Hz, and a plurality of images are continuously reproduced each for ¼ second. In this case, since the discrimination result of step G21 is originally NO, the flow advances to step G22 to discriminate whether the timer is counting. At this point, since counting is not yet started, the flow advances to step G23 from step G22 to shift head 14 for one track. Then, in step G24 a timer for counting a delay time of, e.g., 2 seconds, is started, and the flow returns to step G4 through step G17. When the above timer is started, YES is obtained in step G22. Therefore, until the timer is up, steps G21, G22, G17 and G4 are looped. When 2 seconds have elapsed and "timer up" is detected in step G21, the flow advances to step G25 to discriminate whether it is a timing for shifting head 14 over tracks, i.e., whether a timing signal of 4 Hz is supplied. If NO, the flow returns to step G4 through step G17. However, if YES, the flow advances to step G26 to shift head 14 by one track. Then, the flow returns to step G4 through step G17. While track control switches 18a and 224a are operated, head 14 is advanced by one track every time it is determined in step G25 that a timing signal of 4 Hz is supplied. As a result, a required image can be searched quickly, and images taken in the continuous mode can be displayed as motion images at timings in one-to-one correspondence to the photographing timings.

If NO in steps G18 and G19, the flow advances to steps G27 and G28, respectively, to discriminate whether track control switches 18b and 224b (− keys) are operated. If NO, the flow returns to step G4 through step G17. If YES in steps G27 and G28, the flow advances to step G29 to discriminate whether the current track No. is "1". If YES, the flow returns to step G4 through step G17. If NO, the same operations as that of steps G21 to G26 are performed in steps G30 to G35, and head 14 is shifted. In this case, when head 14 is shifted in steps G32 and G35, "−1 track" processing is performed unlike in the case of steps G23 and G26. The tracks of magnetic disk 101 are subsequently selected and designated in the above manner, and the recorded images of the designated tracks are continuously reproduced. In this case, a required image can be quickly searched in the same manner as for a case the + key is operated for a long time. However, images taken in the continuous mode are displayed as reverse motion images at timings in one-to-one correspondence to the photographing timings.

An operation for erasing recorded images on magnetic disk 101 will be described. Two modes are provided for erasing recorded images: erase I mode for erasing recorded images in units of tracks; and erase II mode for erasing recorded images of all the tracks at once. When recorded images are erased in units of tracks, a desired track No. subjected to erasure is designated in the reproduction mode. Subsequently, erase mode I is designated by main mode shutter 15, and shutter switch 17 serving also as an erase switch is operated. When erase mode I is designated, the flow enters the flow chart of FIG. 13 from step A15 of FIG. 6. In erase mode I, the reproduction circuit system and spindle motor 13 are turned off in step H1. The flow advances to step H2 to read a key input. It is discriminated in step H3 whether erase mode I is set, and it is discriminated in step H4 whether magnetic disk 101 is loaded. If NO in step H3, or if NO in step H4, the flow returns to step A3 of FIG. 6. If YES in step H4, the flow advances to step H5 to discriminate whether the disk cassette 10 has a lug 102b. If NO, the flow advances to step H6 to display characters "Err" (error), and the flow returns to step H2. If YES in step H5, the flow advances to step H7 to display the track No. on LCD 19, and it is discriminated in step H8 whether switch SW2 is ON. If NO, the flow returns to step H2 and the above operation is repeated; if YES, the flow advances to step H9 from step H8 to turn on spindle motor 13. Motor 13 is driven at a speed about ⅓ to ¼ the recording/reproduction speed. In step H10, the erase circuit system is turned on, i.e., recording/erase switching circuit 49 is switched to the erase signal source 50 side, and erase signal source 50 is kept ON for about 1/20 second. An erase signal output from signal source 50 is supplied to magnetic head 14 through recording/erase switching circuit 49, recording amplifier 51, and recording/reproduction switching circuit 52. The recorded contents of the designated track of magnetic disk 101 are erased by head 14. When 1/20 second has elapsed, the flow advances to step H11 to turn off spindle motor 13, the erase circuit system is turned off in step H12, and the flow returns to step H2. Operation of erase mode I is thus completed.

When all the recorded contents of magnetic disk 101 are to be erased, erase mode II is designated by main mode switch 15 and shutter switch 17 is operated. When erase mode II is designated, the flow enters erase mode II of FIG. 14 from step A15. More specifically, the reproduction circuit system and spindle motor 13 are turned off in step I1. Then, a key input is read in step I2. The flow then advances to step I3 to discriminate whether erase mode II is set, and it is discriminated in step I4 whether magnetic disk 101 is loaded. If NO in step I3, or if NO in step I4, the flow returns to step A3 of FIG. 6. If YES in step I4, the flow advances to step I5 to discriminate whether disk cartridge 10 has a lug 102b. If NO, characters "Err" (error) are displayed in step I6, and the flow returns to step I2. If YES in step I5, the flow advances to step I7 to display on LCD 19 characters "ALL" indicating that images recorded on all the tracks are to be erased. Then, it is discriminated in step I8 whether shutter switch SW2 is turned on. If NO, the flow returns to step I2. The above operation is repeated until YES is obtained in step I8. In this state, when shutter switch SW2 is turned on, the flow advances to step I9 from step I8 to shift head 14 to the 1st track, and spindle motor 13 is turned on and rotated at a low speed in step I10. The erase circuit system is kept ON for about 1/20 second in step I11, and the recorded contents on the 1st track of magnetic disk 101 are erased in the same manner as in erase mode I. When the recorded contents of the 1st track are erased, the flow advances to step I12 to shift head 14 to the next track, and its track No. is displayed on LCD 19 in step I13. Thereafter, it is discriminated in step I14 whether the track No. has reached "51". If NO, the flow returns to step I11 and a recorded content on the next track is erased. Steps I11 to I14 are repeated to subsequently erase the recorded contents of the tracks. When the recorded contents of all the tracks are erased, the track No. is "51". Therefore, the flow advances to step I15 from step I14 to turn off motor 13, and the erase circuit system is turned off in step I16. In step I17, magnetic head 14 is shifted to the 1st track. The flow then returns to step I2 to wait for the subsequent key input. Erase mode II is thus completed.

Note that erasing is performed not only by modes I and II described above. Another mode can be added wherein one or two tracks are designated by ten keys or the like, and recorded images on the tracks starting from the designated track, or recorded images on the tracks between the designated tracks are erased.

In the above embodiment, image reproduction at the same timings as photographing timings in the continuous mode is performed by track control switches 18a and 18b, and 224a and 224b that are originally used for searching a desired image. However, a mode selection switch can be provided to switch between the continuous image reproduction mode and a desired image reproduction mode, and the image reproduction timing during search of a desired image can be different from that when continuous images are reproduced. In this case, the circuit arrangement and the entire mechanism become complex. However, in continuous image reproduction mode, since the reproduction timing per one image may be shorter than that of desired image reproduction mode, the continuous photographing speed can be set as high as 10 frames or more per second. When the above-described mode selection switch is provided, a double-speed mode, a slow mode, and the like are also preferably added.

In the above embodiment, when the recording mode is switched to reproduction mode, an image which is taken lately in the recording mode is reproduced first. However, an image which is taken first in the recording mode can be reproduced first. In this case, a flag memory and a track No. memory may be provided in system controller 33, and the system processing program may be altered. The flag memory is set for photographing and reset for mode switching. In the reproduction mode, the track No. memory stores track Nos. subjected to reproduction, and in the recording mode, it stores a start track No. and updates this track No. The system processing program is altered in the following manner. In the main processing shown in FIG. 6, steps A8 to A12 may be omitted. If YES in step A3, and when the magnetic head is shifted in step A7, the flow advances to step A13 and mode discrimination is performed in step A13. In the recording mode processing shown in FIGS. 9-i and 9-ii, prior to the processing of step D1, spindle motor 13 is turned on and empty track search is executed, and it is discriminated immediately before step D16 whether the flag memory is set and, if NO, the contents of the track counter are preset in the track No. memory. In the reproduction mode shown in FIG. 12, in place of executing steps G1 to G3, spindle motor 13 is turned on, magnetic head 14 is shifted to the position of the track No. preset in the above-described memory, and the power source of the reproduction circuit system is turned on in this order.

In the above embodiment, color FM signal CFM is used for detecting an empty track, but luminance FM signal YFM may be used.

In the above embodiment, when recording in all the tracks has been completed, or when an error occurs, it is notified to the user using only display. However, a buzzer or the like may be provided to inform the user of these facts. A monitor such as a color LCD for displaying a reproduced image can be provided to the camera housing. In this case, a circuit for modulating output signal Y+S from luminance signal decoder 55 and output signals R−Y and B−Y from color signal decoder 56 into signals R, G, and B, thus driving the color LCD, may be added to the circuit of the embodiment.

In the above embodiment, mechanical shutter 40 is used. However, when sensing device 41 comprises a CCD, its charge time can be controlled by controlling only the CCD, thereby eliminating a mechanical electronic shutter. Furthermore, the recording medium is not limited to the magnetic disk, and can be a magnetic tape, a semiconductor memory, and so on.

What is claimed is:

1. An electronic still camera comprising:
   (a) recording medium housing means for housing a disk-type recording medium having a number of recording tracks on which still image data is recorded;
   (b) rotation driving means for rotatively driving the disk-type recording medium housed in said recording medium housing means;
   (c) recording/reproduction head means for recording the still image data on said recording medium and for reproducing the still image data recorded on said recording medium;
   (d) head control means for shifting said head means in the radial direction of said recording medium;
   (e) power source switch means;
   (f) initial operation-performing means for performing a predetermined operation when the power source switch means is turned on;
   (g) mode switch select means for selecting a single mode or a continuous mode;
   (h) shutter switch means;
   (i) first recording control means for causing said rotation driving means to start a rotation driving operation when the shutter switch means operates, with the single mode being selected by the mode select means, and for causing said recording/reproduction head means to record the still image data in only one of the recording tracks and to stop the rotation driving operation performed by said rotation driving means after the recording of the still image data;
   (j) second recording control means for causing said rotation driving means to start the rotation driving operation when the shutter switch means operates, with the continuous mode being selected by the mode select means, and for causing said head control means to sequentially shift said recording/reproduction head means at predetermined time intervals and to sequentially record the still image data in the shifted recording tracks;
   (k) rotation driving operation ending means for automatically stopping the rotation driving operation performed by said rotation drive means after still image data is recorded on the last track, thereby ending the recording operation performed by said second recording control means; and
   (l) reproduce means for causing a reproduction of the still image data recorded on said recording medium.

2. An electronic still camera according to claim 1, wherein said initial operation-performing means includes means for causing the head control means to move the recording/reproduction head means to a track of the disk-type recording medium on which no data is recorded.

3. In electronic still camera according to claim 1, wherein said initial operation-performing means includes detecting means for detecting whether or not the recording medium housing means is located at a predetermined position.

4. An electronic still camera according to claim 3, further comprising display means for displaying results of detection performed by the detecting means.

5. An electronic still camera comprising:
   (a) recording medium housing means for housing a disk-type recording medium having a number of recording tracks on which still image data is recorded;
   (b) rotation driving means for rotatively driving the disk-type recording medium housed in said recording medium housing means;
   (c) recording/reproduction head means for recording the still image data on said recording medium and for reproducing the still image data recorded on said recording medium;
   (d) head control means for shifting said head means in the radial direction of said recording medium;
   (e) power source switch means;
   (f) initial operation-performing means for performing a predetermined operation when the power source switch means is turned on;
   (g) mode switch select means for selecting a single mode or a continuous mode;
   (h) shutter switch means;
   (i) first recording control means for causing said rotation driving means to start a rotation driving operation when the shutter switch means operates, with the single mode being selected by the mode select means, and for causing said recording/reproduction head means to record the still image data in only one of the recording tracks and to stop the rotation driving operation performed by said rotation driving means after the recording of the still image data;
   (j) second recording control means for causing said rotation driving means to start the rotation driving operation when the shutter switch means operates, with the continuous mode being selected by the mode select means, and for causing said head control means to sequentially shift said recording/reproduction head means at predetermined time intervals and to sequentially record the still image data in the shifted recording tracks;

(k) display means for displaying whether or not still image data is recorded on the last one of the recording tracks;

(n) rotation driving operation ending means for automatically stopping the rotation driving operation performed by said rotation driving means after still image data is recorded on the last track, thereby ending the recording operation performed by said second recording control means; and (m) reproduce means for causing a reproduction of the still image data recorded on said recording medium.

6. An electronic still camera according to claim 5, further comprising:
   a power source switch; and
   initial setting means, which operates when the power source switch is turned on, for causing the head control means to move the record/reproduction head means to a track of the disk-type recording medium on which no data is recorded.

7. An electronic still camera according to claim 5, further comprising:
   a power source switch; and
   detecting means, which operates when the power source switch is turned on, for detecting whether or not the recording medium housing means is located at a predetermined position.

8. An electronic still camera according to claim 7, further comprising:
   display means for displaying results of detection performed by the detecting means.

9. An electronic still camera comprising:
   (a) recording medium housing means for housing a disk-type recording medium having a number of recording tracks on which still image data is recorded;
   (b) rotation driving means for rotatively driving the disk-type recording medium housed in said recording medium housing means;
   (c) rotation detecting means for detecting whether or not the disk-type recording medium rotated by the rotation driving means has reached a predetermined rotating speed;
   (d) recording/reproduction had means for recording the still image data on said recording medium and for reproducing the still image data recorded on said recording medium;
   (e) head control means for shifting said head means in the radial direction of said recording medium;
   (f) mode select means for selecting a single mode or a continuous mode;
   (g) shutter switch means;
   (h) first recording control means for causing said rotation driving means to start a rotation driving operation when the shutter switch means operates, with the single mode being selected by the mode select means, and for causing said recording/reproduction head means to record the still image data in only one of the recording tracks, when the rotation detecting means detects that the recording medium has reached the predetermined rotating speed, and then to stop the rotation driving operation performed by said rotation driving means after the recording of the still image data;

(i) second recording control means for causing said rotation driving means to start the rotation driving operation when the shutter switch means operates, with the continuous mode being selected by the mode select means, and for causing said head control means to sequentially shift said recording/reproduction head means at predetermined time intervals and to sequentially record the still image data in the shifted recording tracks, while the shutter switch means is operating;

(j) rotation driving operation ending means for automatically stopping the rotation driving operation performed by said rotation drive means after still image data is recorded on the last track, thereby ending the recording operation performed by said second recording control means even if the shutter switch means is still operating; and (k) reproduce means for causing a reproduction of the still image data recorded on said recording medium.

10. An electronic still camera according to claim 9, further comprising:
    a power source switch; and
    initial setting means, which operates when the power source switch is turned on, for causing the head control means to move the recording/reproduction head means to a track of the disk-type recording medium on which no data is recorded.

11. An electronic still camera according to claim 9, further comprising:
    a power source switch; and
    detecting means, which operates when the power source switch is turned on, for detecting whether or not the recording medium housing means is located at a predetermined position.

12. An electronic still camera according to claim 11, further comprising:
    display means for displaying results of detection performed by the detecting means.

13. An electronic still camera comprising:
    (a) recording medium housing means for housing a disk-type recording medium having a number of recording tracks on which still image data is recorded;
    (b) rotation driving means for rotatively driving the disk-type recording medium housed in said recording medium housing means;
    (c) speed detecting means for detecting the rotating speed of the disk-type recording medium driven by the rotation driving means;
    (d) recording/reproduction head means for recording the still image data on said recording medium and for reproducing the still image data recorded on said recording medium;
    (e) a head control means for shifting said head means in the radial direction of said recording medium;
    (f) first operating switch means;
    (g) first recording control means for causing said first operating switch means to start the rotation driving operation performed by said rotation driving means, and for causing said recording/reproduction head means to record the still image data in only one of the recording tracks, when the rotating speed detected by the speed detecting means has reached a predetermined value, and then to stop the rotation driving operation performed by said rotation driving means after the recording of the still image data;

(h) second operating switch means;

(i) second recording control means for causing said second operation switch means to start the rotation driving operation performed by said rotation driving means, and for causing said head control means to sequentially shift said recording/reproduction head means at predetermined time intervals and to sequentially store the still image data in the shifted recording tracks, while a switching operation is being performed with the second operating switch means;

(j) recording ending means for automatically stopping the rotation driving operation performed by said rotation driving means after still image data is recorded on a last one of the recording tracks under the control of the second recording control means, thereby ending the recording operation performed by said second recording control means even if the second operation switch means is still being operated; and (k) reproduce means for causing a reproduction of the still image data recorded on said recording medium.

14. An electronic still camera according to claim 13, further comprising:

a power source switch; and initial setting means, which operates when the power source switch is turned on, for causing the head control means to move the recording/reproduction head means to a track of the disk-type recording medium on which no data is recorded.

15. An electronic still camera according to claim 13, further comprising:

a power source switch; and detecting means, which operates when the power source switch is turned on, for detecting whether or not the recording medium housing means is located at a predetermined position.

16. An electronic still camera according to claim 15, further comprising:

display means for displaying results of detection performed by the detecting means.

* * * * *

UNITED STATES PATENT AND TRADEMARK OFFICE
CERTIFICATE OF CORRECTION

PATENT NO. : 5,032,930
DATED : July 16, 1991
INVENTOR(S) : SUETAKA et al

It is certified that error appears in the above-identified patent and that said Letters Patent is hereby corrected as shown below:

Title page, Section [30] Foreign Application Priority Data:

Change the Japanese application number 61-193677 to

--61-193677[U]--.

Signed and Sealed this

Tenth Day of August, 1993

Attest:

MICHAEL K. KIRK

Attesting Officer    Acting Commissioner of Patents and Trademarks